(12) United States Patent
Sakurai et al.

(10) Patent No.: US 7,319,498 B2
(45) Date of Patent: Jan. 15, 2008

(54) ELECTRO-OPTICAL DEVICE, ELECTRONIC APPARATUS, AND METHOD OF PRODUCING ELECTRO-OPTICAL DEVICE

(75) Inventors: Shinji Sakurai, Nagano (JP); Kazunori Takabayashi, Nagano (JP); Norihide Momose, Nagano (JP); Nami Arafuka, Nagano (JP)

(73) Assignee: Seiko Epson Corporation (JP)

( * ) Notice: Subject to any disclaimer, the term of this patent is extended or adjusted under 35 U.S.C. 154(b) by 187 days.

(21) Appl. No.: 10/944,692

(22) Filed: Sep. 17, 2004

(65) Prior Publication Data

US 2005/0094052 A1 May 5, 2005

(30) Foreign Application Priority Data

Sep. 19, 2003 (JP) ............................. 2003-327982
May 31, 2004 (JP) ............................. 2004-161577

(51) Int. Cl.
*G02F 1/1333* (2006.01)
*G02F 1/1335* (2006.01)
*F21V 7/04* (2006.01)

(52) U.S. Cl. ............................ 349/58; 349/61; 349/65; 362/612; 362/634

(58) Field of Classification Search ................. 349/58; 362/612–613, 632–634
See application file for complete search history.

(56) References Cited

U.S. PATENT DOCUMENTS

| | | | | |
|---|---|---|---|---|
| 5,479,285 A | * | 12/1995 | Burke | 349/58 |
| 6,806,920 B2 | * | 10/2004 | Hayashi et al. | 349/58 |
| 2002/0036745 A1 | | 3/2002 | Kim | |
| 2002/0080298 A1 | * | 6/2002 | Fukayama | 349/58 |
| 2002/0135572 A1 | * | 9/2002 | Weindorf | 345/204 |
| 2002/0180923 A1 | * | 12/2002 | Aoyagi et al. | 349/149 |

(Continued)

FOREIGN PATENT DOCUMENTS

JP 05-257128 10/1993

(Continued)

OTHER PUBLICATIONS

Examination result issued in corresponding Korean application.

(Continued)

*Primary Examiner*—David Nelms
*Assistant Examiner*—W. Patty Chen
(74) *Attorney, Agent, or Firm*—Harness, Dickey & Pierce, P.L.C.

(57) ABSTRACT

An electro-optical device comprises: an upper frame formed of a metal having an opening formed therein and having open portions formed in at least two corners thereof; an electro-optical panel having an electro-optical substance sealed between a pair of plates and arranged below the upper frame; a light guide plate arranged below the electro-optical panel; and an intermediate frame having a frame shape, arranged below the light guide plate, and being applied to support the electro-optical panel and the light guide plate. The electro-optical panel and the light guide plate is sandwiched between the upper frame and the intermediate frame. The peripheral edge along the four sides of the electro-optical panel is bonded to the upper frame by an adhesion element, and at least two corners of the intermediate frame are exposed in the open portions of the upper frame.

8 Claims, 9 Drawing Sheets

U.S. PATENT DOCUMENTS

| | | | |
|---|---|---|---|
| 2004/0114062 A1 | 6/2004 | Nishio et al. | 349/58 |
| 2004/0160546 A1* | 8/2004 | Huang et al. | 349/58 |

FOREIGN PATENT DOCUMENTS

| | | |
|---|---|---|
| JP | 05-257130 | 10/1993 |
| JP | 2000-066178 | 3/2000 |
| JP | 2001-125073 | 5/2001 |
| JP | 2001-255516 | 9/2001 |
| JP | 2002-116430 | 4/2002 |
| JP | 2002-333606 | 11/2002 |
| JP | 2003-177379 | 6/2003 |
| KR | 2002-0018517 | 3/2002 |
| KR | 0365177 | 12/2002 |
| KR | 2003-54764 | 7/2003 |

OTHER PUBLICATIONS

Communication from Korean Patent Office regarding counterpart application.

* cited by examiner

ELECTRO-OPTICAL DEVICE, ELECTRONIC APPARATUS, AND METHOD OF PRODUCING ELECTRO-OPTICAL DEVICE

RELATED APPLICATIONS

This application claims priority to Japanese Patent Application No. 2003-327982 filed Sep. 19, 2003 and 2004-161577 filed May 31, 2004 which is hereby expressly incorporated by reference herein in its entirety.

BACKGROUND

The present invention relates to an electro-optical device such as a liquid crystal display device, a method of producing the same, and an electronic apparatus having the electro-optical device mounted thereon.

In recent years, electro-optical devices such as liquid crystal display devices or the like have been widely used in electronic apparatuses such as portable telephones and so forth. Generally, transflective type liquid crystal displays mounted in portable electronic apparatuses comprise a liquid crystal display panel, a light guide plate, a flexible printed circuit board (hereinafter, abbreviated as FPC) having a circuit in which a signal for driving the liquid crystal panel is generated, a light source such as a light emitting diode (LED), and so forth, a reflection sheet, a casing, and so forth.

Referring to an example of a method of producing the above-described liquid crystal display device, first, the lower surface of the liquid crystal display panel and the upper surface of the light guide plate are bonded to each other via a two-sided adhesive tape. Next, the lower surface of the light guide plate and the reflection sheet are bonded to each other via a two-sided adhesive tape. Thereafter, the FPC which is electrically connected to the liquid crystal display panel is bent. The upper surface of the bent portion of the FPC is bonded to the lower surface of the reflection sheet by a two-sided adhesive tape. The formed piece is contained in a casing. Thus, a liquid crystal display device is produced. As described above, for production of known liquid crystal display devices, generally, a liquid crystal panel and FPC are fixed to a light guide plate, a reflection sheet, and so forth by a two-sided adhesive tape.

Moreover, in a known liquid crystal display device, a liquid crystal display panel is sandwiched between a frame-shaped upper case made of a metal plate and a back light unit. For locking, claws for locking formed on the upper case are fitted into grooves formed on the side walls of a mold (lower case). Thus, the upper case, the liquid crystal display panel, and the back light unit are fixed together.

Moreover, a liquid crystal display device is known, which is provided with a liquid crystal display panel, a back light unit, and so forth in the same manner as described above.

However, in the case of the above-described liquid crystal display device, the liquid crystal display panel, the FPC, the light guide plate, the reflection sheet, and so forth are fixed by two-sided adhesive tapes. Thus, in some cases, the two-sided adhesive tapes are peeled off from the light guide plate, the reflection sheet, and so forth in a high temperature environment. Thus, the FPC, the reflection sheet, and so forth float from the liquid crystal display panel and the light guide plate. Especially, in the case of FPC having an LED mounted thereon, the optical axis of the LED and the central axis of the light guide plate are shifted from each other. The luminance of the LED may be reduced.

The electronic apparatus having the above-described liquid crystal display device mounted thereon has problems in that the liquid crystal display panel may be deflected or broken if the device happens to drop.

In view of the foregoing, the present invention has been devised, and it is an object of the present invention to prevent a liquid crystal display panel from being deflected or broken and also prevent the FPC or the like from floating when an electro-optical device happens to drop by the arrangement position of metallic upper and lower frames in the electro-optical device.

SUMMARY

According to an aspect of the present invention, the electro-optical device comprises: an upper frame formed of a metal having an opening formed therein and having open portions formed in at least two corners thereof; an electro-optical panel having an electro-optical substance sealed between a pair of plates and arranged below the upper frame; a light guide plate arranged below the electro-optical panel; and an intermediate frame having a frame shape, arranged below the light guide plate, and being applied to support the electro-optical panel and the light guide plate. The electro-optical panel and the light guide plate are sandwiched between the upper frame and the intermediate frame. The peripheral edge along the four sides of the electro-optical panel is bonded to the upper frame by an adhesion element, and at least two corners of the intermediate frame are exposed in the open portions in the at least two corners of the upper frame.

The electro-optical device may be a liquid crystal display device. The electro-optical panel such as a liquid crystal display panel or the like is sandwiched between the light guide plate arranged below the panel, the upper frame, and the intermediate frame. The upper frame is made of metal. The display unit of the electro-optical panel is arranged in the opening of the upper panel. The peripheral edge portions along the four sides of the electro-optical panel are bonded to the upper frame by an adhesion element such as a two-sided adhesive tape or the like. This prevents dust or foreign matters from intruding therein. Moreover, since the upper frame and the electro-optical panel closely contact each other, the drop-strength of the electro-optical panel is enhanced. At least two corresponding corners of the intermediate frame are set in the open portions formed in the tow corners of the upper frame. Thus, an external force or impact applied to the upper frame is prevented from directly exerting an influence over the display surface of the electro-optical panel.

According to another aspect of the present invention, an electro-optical device comprises: an upper frame formed of a metal having an opening formed therein and having open portions formed in at least two corners thereof; an electro-optical panel having an electro-optical substance sealed between a pair of plates and arranged below the upper frame; a light guide plate arranged below the electro-optical panel; an intermediate frame having a frame shape, arranged below the light guide plate, and applied to support the electro-optical panel and the light guide plate; a flexible board having at least a light source mounted thereon, arranged below the intermediate frame, and electrically connected to the electro-optical panel; and a belt-shaped lower frame made of metal arranged below the board, and fixed to the intermediate frame. The electro-optical panel and the light guide plate are sandwiched between the upper frame and the intermediate frame, and the upper frame and the lower frame are arranged in such positions as to be prevented from coming into contact with each other.

The electro-optical device may be a liquid crystal display device. The electro-optical panel such as a liquid crystal display panel or the like is sandwiched between the light guide plate arranged below the panel, the upper frame, and the intermediate frame. The upper frame is made of metal. The display unit of the electro-optical panel is arranged in the opening of the upper panel. The peripheral edge portions along the four sides of the electro-optical panel are bonded to the upper frame by an adhesion element such as a two-sided adhesive tape or the like. This prevents dust or foreign matters from intruding therein. Moreover, since the upper frame and the electro-optical panel closely contact each other, the drop-strength of the electro-optical panel is enhanced. At least two corresponding corners of the intermediate frame are set in the open portions formed in the two corners of the upper frame. Thus, an external force or impact applied to the upper frame is prevented from directly exerting an influence over the display surface of the electro-optical panel.

Since the flexible board having a light source mounted thereon is arranged below the intermediate frame, and the belt-shaped lower frame is fixed to the intermediate frame, the flexible board is held below the intermediate frame. Moreover, the upper frame and the lower frame are positioned so as to be prevented from coming into contact with each other. Thus, an external force applied to one of the frames is not exerted on the other and the strength of the electro-optical device as a whole is enhanced.

According to another form of the electro-optical device, the lower frame is fixed to the intermediate frame so as to cover the light source positioned on the board. Thus, the lower frame made of metal can function as a heat-radiation member for radiating the heat generated by the light source.

According to a still another form of the present invention, the light guide plate, the board, and the lower frame are arranged so relatively to each other that the center axis in the height direction of the light source and the center axis in the thickness direction of the light guide plate coincide with each other. Thereby, light emitted from the light source can be efficiently guided to the electro-optical panel via the light guide plate. Thus, the display luminance can be assured.

According to yet another form of the electro-optical display, the end portion of the board, which is connected to the electro-optical panel, is bent and sandwiched between the intermediate frame and the lower frame while the board is in the end bending state, and a reflection sheet is provided between the intermediate frame and the board. Thereby, illumination light emitted from the light source can be reflected toward the electro-optical panel.

According to another form of the electro-optical device, for the lower frame, the peripheral edge portions along both of the short sides and the peripheral edge portion along at least one long side are bent. Thereby, the strength of the lower frame itself is enhanced, and moreover, the lower frame is assuredly fixed to the intermediate frame.

According to a still another form of the electro-optical device, the peripheral edge portion of the upper frame is bent. Thereby, the strength of the lower frame can be enhanced, and also, the strength of the electro-optical device as a whole is enhanced. Moreover, an electronic apparatus equipped with the above-described electro-optical device as a display unit can be produced.

According to yet another form of the electro-optical device, a method of producing an electro-optical device comprises the steps of axing a flexible board having at least a light source mounted thereon onto an electro-optical panel having an electro-optical substance sealed between a pair of plates; fixing the electro-optical panel and a light guide plate arranged below the electro-optical panel to a frame-shaped intermediate frame; fixing an upper frame formed of a metal having an opening formed therein and having open portions in at least two corners thereof to the intermediate frame from the upper side of the electro-optical panel and the light guide plate; fixing a reflection sheet to the lower surface of the intermediate frame; bending the portion of the board connected to the electro-optical panel, arranging the board below the reflection sheet, and fixing a belt-shaped frame made of metal to the intermediate frame from the lower side of the board.

According to this method of producing an electro-optical device, an electro-optical panel such as a liquid crystal display panel and a light guide plate are sandwiched between the upper frame and the intermediate frame. Thus, the drop-strength can be enhanced. The board such as FPC or the like connected to the electro-optical panel is bent, arranged below the intermediate frame, and together with the reflection sheet, held to the intermediate frame by the lower frame. Thereby, the board such as FPC or the like can be prevented from being peeled and floating from the intermediate frame. Thus, the strength of the electro-optical device can be enhanced. Moreover, the heat generated due to the light source can be radiated by the lower frame.

According to a form of the method of producing an electro-optical device, the lower frame is fixed to the intermediate frame in such a position that the lower frame is prevented from coming into contact with the upper frame and covers the light source on the board. Thereby, an external force or an impact applied to one of the upper frame and the lower frame is prevented from being exerted on the other since the upper and lower frames do not interfere with each other. Thus, the strength of the whole of the electro-optical device can be enhanced.

DETAILED DESCRIPTION

A best mode of the present invention will be described with reference to the drawings. Hereinafter, a liquid crystal display device will be described, which is one example of the electro-optical device to which the first embodiment of the present invention is applied.

Figure 1:
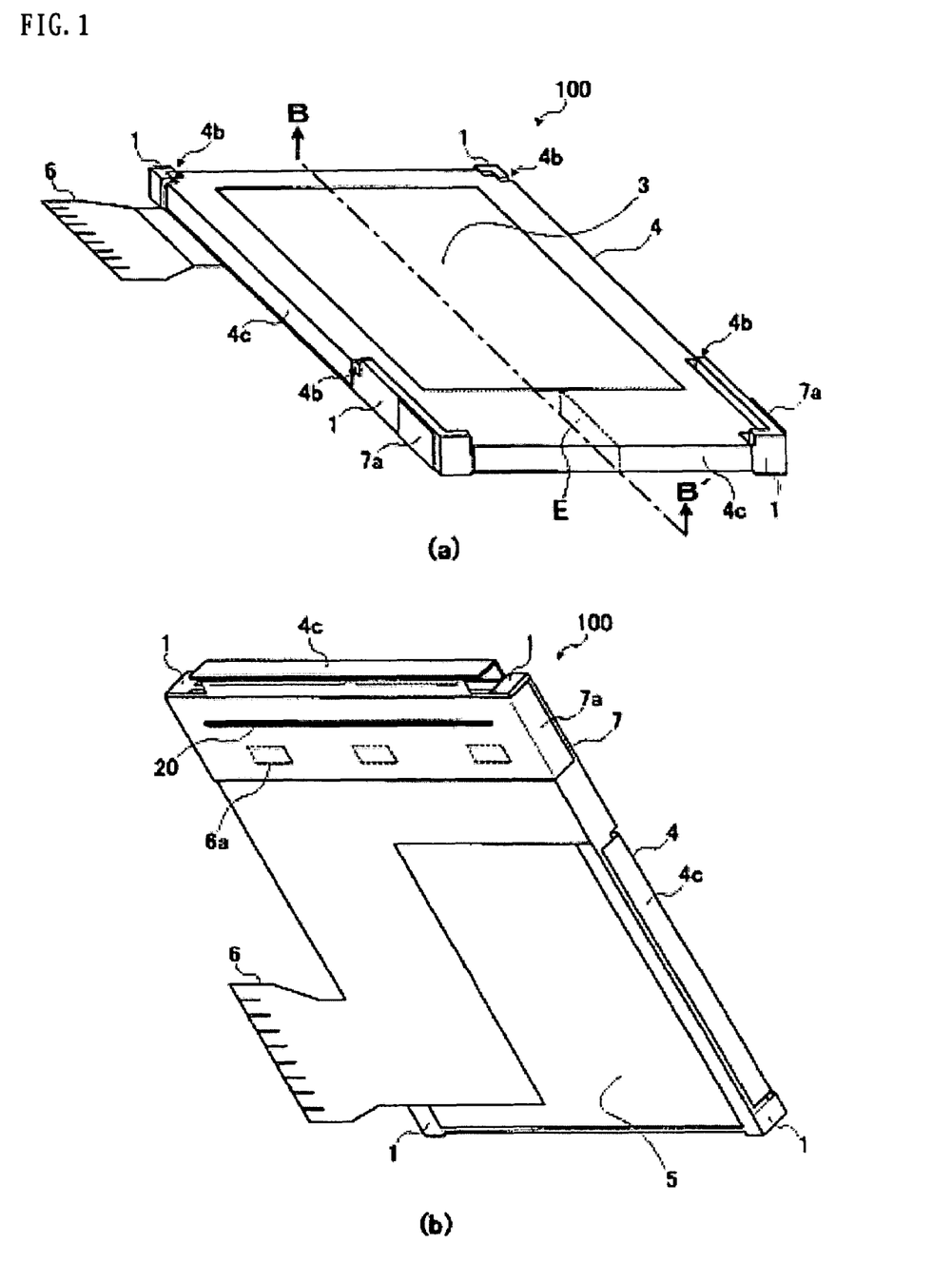
FIG. 1 is a perspective view showing the configuration of a liquid crystal display device according to a first embodiment of the present invention.
Figure 2:
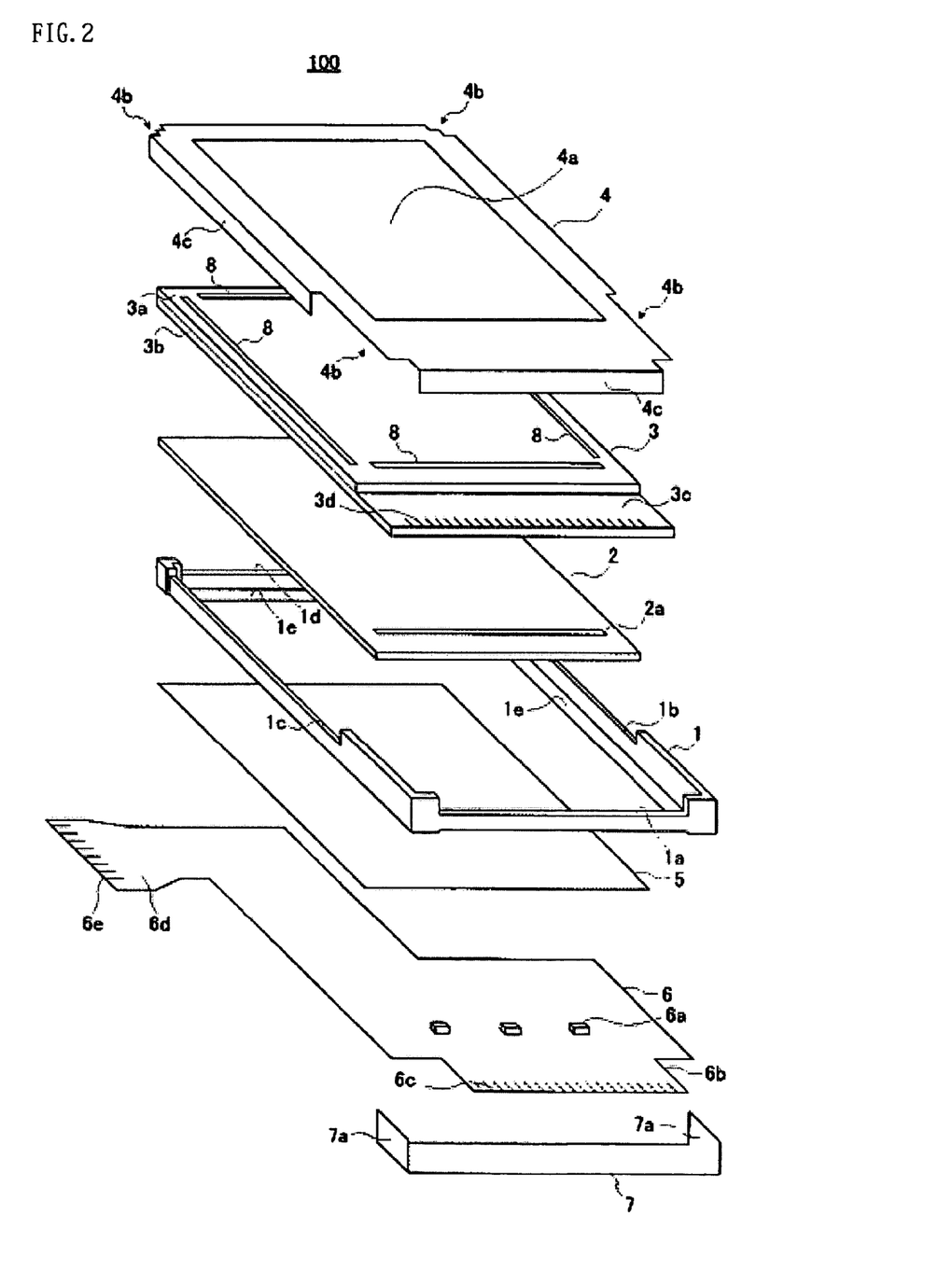
FIG. 2 is an exploded perspective view of the liquid crystal display device shown in FIG. 1.

FIG. 1 is a perspective view showing the outline of the configuration of a liquid crystal display device according to a first embodiment of the present invention. FIG. 1(a) shows a liquid crystal display device 100 on the display unit side (upper surface side). FIG. 1(b) shows the device on the back-surface side. FIG. 2 is an exploded perspective view of the liquid crystal display device 100 of FIG. 1.

As shown in FIGS. 1 and 2, the liquid crystal display device 100 comprises an upper frame 4, a liquid crystal display panel 3, a light guide plate 2, an intermediate frame 1, a reflection sheet 5, a FPC 6, and a lower frame 7 in that order as viewed from the upper side of FIG. 2.

The liquid crystal display panel 3 is formed by sealing a liquid crystal between a pair of transparent plates 3a and 3b, which are glass plates or the like, via a sealing member not shown in the drawings. According to the first embodiment, the liquid crystal display panel 3 is a so-called transflective type liquid crystal display panel. In particular, with this panel, transmission-display can be carried out using illumination light from the backlight unit disposed on the lower side, viewed in FIG. 2, of the liquid crystal display panel 3. Moreover, reflection-display can be performed using external light such as solar light, illumination light, and so forth which is applied from the upper side as viewed in FIG. 2. The lower transparent plate 3b is provided with a projected portion 3c in contrast to the upper transparent plate 3a. A terminal unit 3d for electrical connection to the FPC 6 is formed on the projected portion 3c. It is to be noted that according to the present invention, the internal configuration of the liquid crystal display panel 3 is arbitrary.

A two-sided adhesive tape 8 is bonded to the upper surface of the liquid crystal display panel 3 along the four sides which exist on the outer side of the display area and along the peripheral edge of the panel 3. The thickness of the two-sided adhesive tape 8 is, e.g., about 200 μm. The two-sided adhesive tape 8 is used for temporary fixation of the liquid crystal display panel 3 to the upper frame 4, and also, is effective in preventing external dust and foreign matters from intruding into the panel 3. Moreover, since the upper frame 4 and the liquid crystal display panel 3 are closely bonded to each other with the two-sided adhesive tape 8, the dropping strength of the liquid crystal display panel 3 can be enhanced. In the case in which fins exist on the end portions or the like of the metallic upper frame 4, the two-sided adhesive tape 8 has a function of preventing a polarizing plate bonded to the outer surface of the liquid crystal display panel 3 from being injured.

The upper frame 4 is a metallic frame made of, e.g., stainless steel, aluminum, or the like, and together with the intermediate frame 1, holds and fixes the liquid crystal display panel 3 and the light guide plate 2 between them. The upper frame 4 has an opening 4a substantially in the center thereof corresponding to the display area of the liquid crystal display panel 3.

Moreover, the upper frame 4 has side portions 4c which are bent substantially in the perpendicular direction to the four sides in the periphery thereof. These side portions 4c sandwich the four sides of the intermediate frame 1 from the outer side. Furthermore, the upper frame 4 has open portions 4b which are formed by cutting off the side portions in the four corners of the frame 4. As shown in FIG. 1(a), the four corers of the intermediate frame 1 are exposed through the open portions 4b in the liquid crystal display device 100 after it is assembled. Thereby, when the liquid crystal display device 100 is arranged in the predetermined position in the casing of an electronic apparatus, the piece in contact with the upper frame 4 can be prevented from directly pressing against the surface of the liquid crystal display panel 3. As the material of the upper frame 4, stainless steel or the like is preferable when the strength required to hold the liquid crystal display panel 3 is important. On the other hand, when it is important for the material to be light weight, aluminum or the like is employed. It is to be understood that when the same metal is employed as the material, the strength of the material can be adjusted by setting the thickness at different values.

The light guide plate 2 is bonded to the lower surface of the liquid crystal display panel 3 by an adhesion element such as a two-sided adhesive tape or the like. As the light guide plate 2, a plate made of a transparent resin and having a scattering shape such as small concavities and convexities formed on the surface thereof may be employed. The light guide plate 2 is a so-called light-guide, and has a function of scattering and reflecting light beams emitted from a light source so that the liquid crystal display panel 3 is illuminated from the back side thereof. The light guide plate 2 is provided with an elongated opening 2a through which the LED 6a, as a light source, is inserted.

The intermediate frame 1 which is made of plastics or the like and has a frame shape is arranged below the light guide plate 2. The intermediate frame 1 is a member for holding the light guide plate 2 and the liquid crystal display panel 3. Supports 1a to 1d are formed in the periphery along the four sides of the intermediate frame 1, and have lengths corresponding to the side portions 4c along the four sides of the upper frame 4. The supports 1a to 1d are formed so as to have a smaller thickness in the longitudinal direction compared to the other portions in the four corners.

The reflection sheet 5 is bonded to the lower surface of the intermediate frame 1 with a two-sided adhesive tape or the like. The reflection sheet 5 has a reflecting surface on the upper side thereof as viewed in FIG. 2.

The FPC 6 is a flexible printed circuit board having a circuit and a wiring formed thereon which are required for the display and control of the liquid crystal display panel 3, and is electrically connected to the liquid crystal display panel 3. As shown in FIG. 2, a plurality of terminals 6c connected to the liquid crystal display panel 3 are formed on an end portion 6b thereof. Moreover, a plurality of terminals 6e are formed in another end portion 6d of the FPC 6. The terminals 6e are connected to the main substrate of the electronic apparatus on which the liquid crystal display device 100 is mounted. A control signal required for image-display on the liquid crystal display panel 3 and image data to be displayed are input to the FPC 6 via the terminals 6e, and are supplied to the liquid crystal display panel 3 through a wiring or the like on the FPC 6.

Plural LEDs 6a (three in this embodiment), which function as a light source of the back light unit, are mounted on the FPC 6. The intermediate frame 1, the reflection sheet 5, the light guide plate 2, and the LEDs 6a constitute the backlight unit which illuminates the liquid crystal display panel 3 from the back-surface side. In particular, the backlight unit is provided with the reflection sheet 5 on the bottom thereof. The light guide plate 2 supported by the intermediate frame 1 is provided thereon. The length of the reflection sheet 5 in the depth direction as viewed in FIG. 2 is smaller than that of the light guide plate 2. Thus, the intermediate frame 1 is provided with an area on this side in the depth direction where no reflection sheet 5 exists, as shown in FIG. 2. Through the area, the LEDs 6a mounted on the FPC 6 are inserted into the opening 2a formed in the light guide plate 2, and are held therein. The LEDs 6a emit illumination light in the direction of the light guide plate 2.

The illumination light is reflected by the reflection sheet 5, and also scattered by the light guide plate 2. Thus, the lower surface of the liquid crystal display panel 3 is illuminated. Thereby, with the liquid crystal display panel 3, the transmission-display can be carried out.

The lower frame 7 is a belt-shaped frame made of metal as well as the upper frame, and has side-portions 7*a* which are formed by bending both-ends in the longitudinal direction thereof to be substantially upright. The bent side portions 7*a* are inserted into the corresponding open portions 4*b* of the upper frame 4 as shown in FIG. 1(*a*) and (*b*), and are held with the intermediate frame 1 being interposed. As shown in FIG. 1(*b*), the lower frame 7 is positioned so as to cover at least the area where the LEDs 6*a* are formed on the FPC 6. Thus, the lower frame 7 has a function of pressing the FPC 6 against the intermediate frame 1. This is effective in preventing the problems in that the FPC 6, especially, the LEDs 6*a* and their adjacent portions are caused to float from the intermediate frame 1, so that the illumination light from the LEDs 6*a* is not sufficiently guided toward the light guide plate 2, the display luminance of the liquid crystal display panel 3, and so forth. Moreover, the lower frame 7 has a function of absorbing heat generated by light-emission of the LEDs 6 and radiating the heat toward the outside. In the case in which the radiation effect is important, preferably, the lower frame 7 is made of metal such as aluminum or the like. Moreover, the effect of radiating the heat generated by the light-emission of the LEDs can be enhanced by increasing the size of the lower frame 7 (increasing the surface area).

As shown in FIG. 1, the upper frame 4 and the lower frame 7 are positioned to connect to each other when the liquid crystal display device 100 is assembled. Specifically, in the example of FIG. 1, the side portions 7*a* of the lower frame 7 sandwich the intermediate frame 1 with the side portions 7*a* being inserted in the open portions 4*b* formed in the upper frame 4. Thereby, undesirable mechanical interference of the upper frame 4 and the lower frame 7 is prevented. Thus, a force applied to one of the frames 4 and 7 is prevented from exerting an influence on the other.

According to the above-described embodiment, the side portions are formed by bending the peripheral edges of the upper frame 4 and the lower frame 7. If an electronic apparatus having the liquid crystal display device 100 mounted thereon such as a portable telephone or the like happen to drop, a force tends to be applied to the surface of the liquid crystal display panel 3 in a twisting direction. Since the peripheries of the upper frame 4 and the lower frame 7 are bent, the above described twisting force or impact can be absorbed in the respective frames, and thus, the liquid crystal display panel 3 can be protected. Thereby, the liquid crystal display panel 3 can be suppressed from being cracked and so forth.

Figure 3:
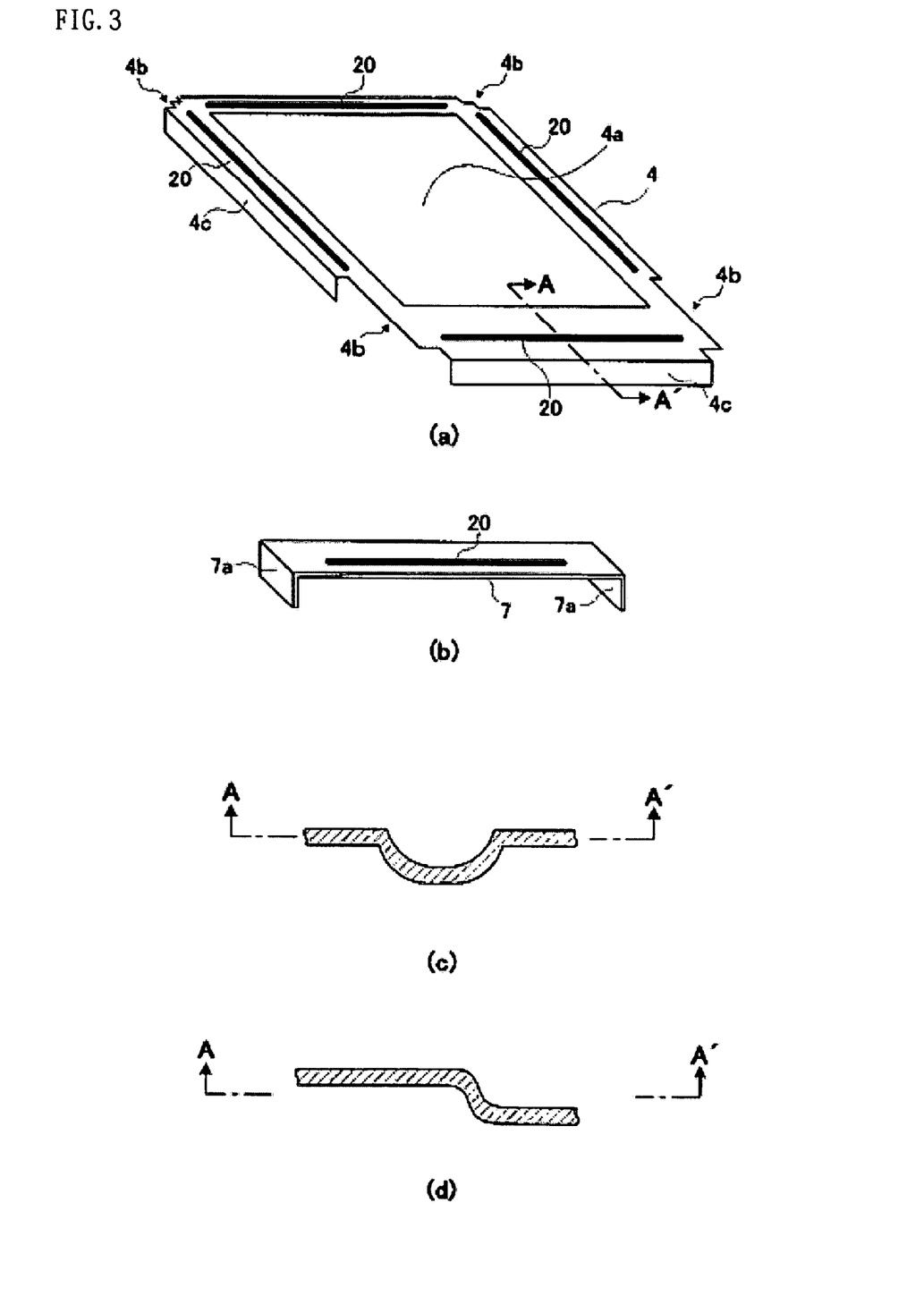
FIG. 3 illustrates an example of bending the frames.

According to the above-described embodiment, the four sides of the upper frame 4 and the end-portions, i.e., the two sides in the longitudinal direction of the lower frame 7, are bent. Bending which is different from the above-described style of bending may be employed as shown in FIG. 3. FIG. 3(*a*) and (*b*) schematically show an example of another type of bending applied to the upper frame 4 and the lower frame 7. Specifically, indentation-work as cross-sectionally illustrated in FIG. 3(*c*), and drawing-work as cross-sectionally illustrated in FIG. 3(*d*) can be carried out for the respective sides so that the strength is increased. Since the upper frame 4 has a function of protecting the liquid crystal display panel 3 as a whole, it is preferable that all four of the sides are subjected to some bending. On the other hand, for the lower frame 7, both of the end-portions in the longitudinal direction are bent as shown in FIG. 1(*b*), Additionally, at least one of the end portions in the short-side direction is preferably bent.

Figure 4:
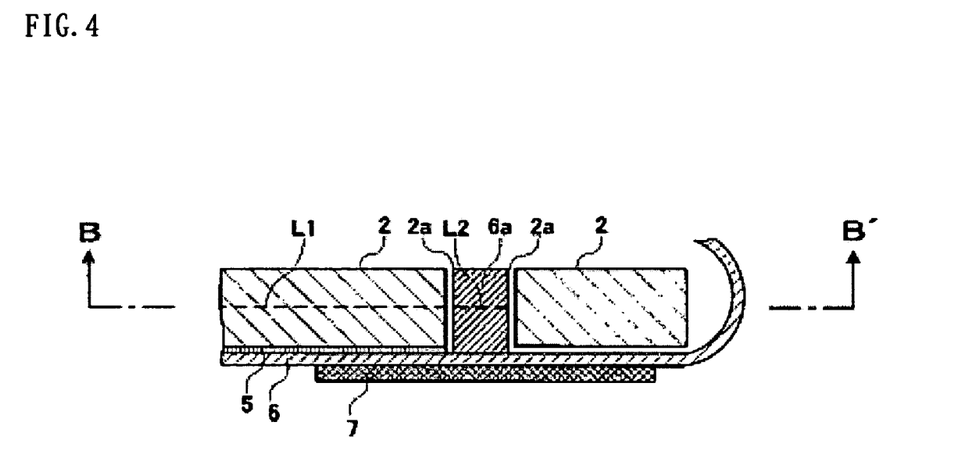
FIG. 4 is a cross-sectional view of a backlight unit.

FIG. 4 shows the cross-section of part E of the backlight unit taken in line B-B' in FIG. 1(*a*). As shown in FIG. 4, the light guide plate 2 is provided with the opening 2*a*. The LED 6*a* is contained in the opening 2*a*. The LED 6*a* is fixed on the FPC 6. The end of the FPC 6 is bent to be upright and is connected to the liquid crystal display panel 3. Moreover, the lower frame 7 is arranged below the FPC 6. In this case, the light guide plate 2, the FPC 6, and the lower frame 7 are arranged so that the center axis L2 of the LED 6*a*, i.e., the optical axis L2 of illumination light emitted from the LED 6*a* coincides with the center axis L1 in the thickness direction of the light guide plate 2 as shown by the broken line. Thereby, the illumination light emitted from the LED 6*a* can be effectively scattered and reflected. Thus, the lower surface side of the liquid crystal display panel 3 can be illuminated.

Second Embodiment

Hereinafter, the constitution or the like of a liquid crystal display device according to a second embodiment of the present invention will be described. In the following description, the same components as those of the liquid crystal display device 100 of the first embodiment are designated by the same reference numerals, and the description is not repeated.

Figure 5:
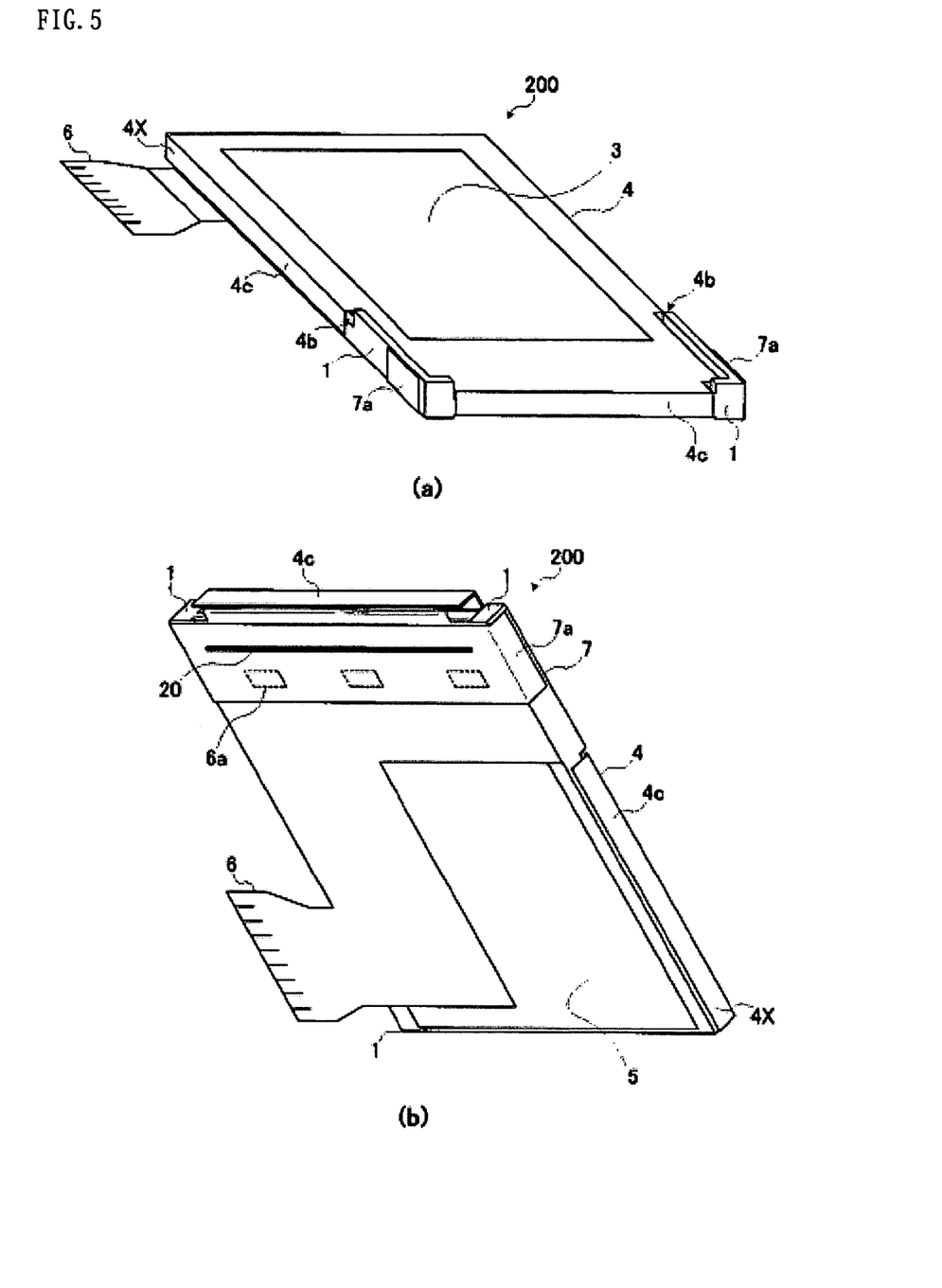
FIG. 5 is a perspective view showing the configuration of a liquid crystal display device according to a second embodiment of the present invention.
Figure 6:
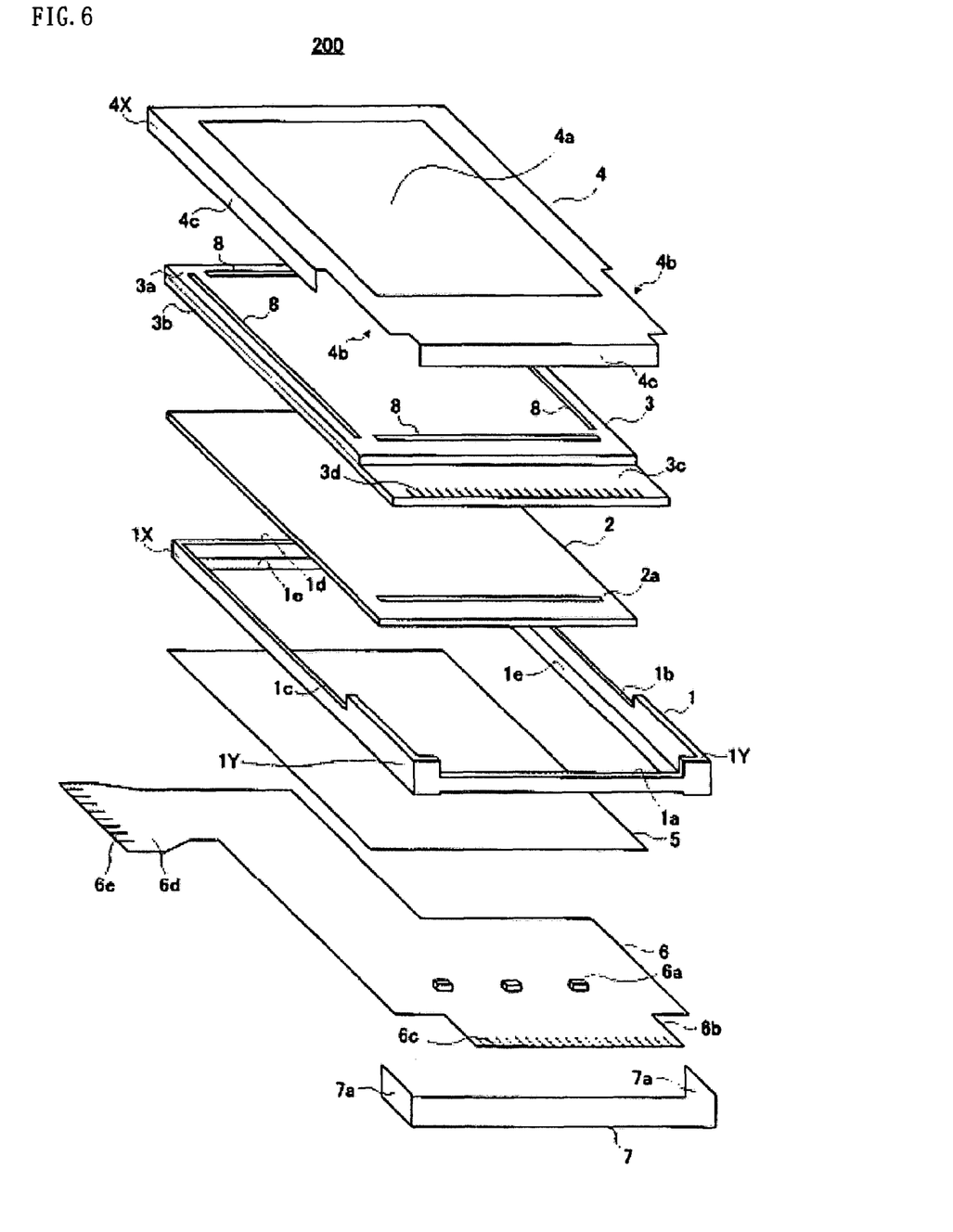
FIG. 6 is an exploded perspective view of the liquid crystal display device shown in FIG. 5.

FIG. 5 is a perspective view showing the outline of the configuration of a liquid crystal display device according to a second embodiment of the present invention. FIG. 5(*a*) shows a liquid crystal display device 200 on the display unit side (upper surface side). FIG. 5(*b*) shows the device on the back-surface side. FIG. 6 is an exploded perspective view of the liquid crystal display device 200 of FIG. 5.

As shown in FIGS. 5 and 6, the liquid crystal display device 200 according to the second embodiment comprises the upper frame 4, the liquid crystal display panel 3, the light guide plate 2, the reflection sheet 5, the FPC 6, and the lower frame 7 in that order as viewed from the upper side of FIG. 6. The configuration is almost the same as that of the liquid crystal display device 100 according to the first embodiment. However, the liquid crystal display device 200 of the second embodiment is different from that of the first embodiment in the configurations of the upper frame 4 and the intermediate frame 1.

The above-described liquid crystal display device 100 of the first embodiment has the open portions 4*b* which are formed by cutting the side portions 4*c* in the four corners of the upper frame 4. Moreover, in the liquid crystal display device 100 of the first embodiment, all of the four corners are formed so as to have a larger thickness in the longitudinal direction than the supports 1*a* to 1*d* thereof. In the open portions 4*b* of the upper frame 4, the corresponding four corners of the intermediate frame 1 are disposed. The four corners of the intermediate frame 1 are exposed in the open portions 4*b* in the assembled liquid crystal display device 100. This prevents an external force or impact applied to the upper frame 4 from directly exerting an influence over the display surface of the liquid crystal display panel 3.

On the other hand, in the liquid crystal display device 200 according to the second embodiment, the open portions 4*b* are formed only in two corners of the upper frame 4. Specifically, in the assembled liquid crystal display device 200, the open portions 4*b* are formed in the two corners of the upper frame 4 and are positioned corresponding to the arrangement of the side portions 7a of the lower frame 7. No open portions 4b are provided for the two corners 4X on the opposite side of the above-described two Corners. The portions of the two corners 4X form a box-shape. The two corners of the intermediate frame 1 have the same shapes of the corresponding two corners of the intermediate frame 1 according to the first embodiment. The two corners of the intermediate frame 1 positioned corresponding to the open portions 4b of the upper frame 4 have the same shape as the two corners of the corresponding intermediate frame 1 according to the first embodiment. On the other hand, the two corners 1X of the intermediate frame 1 positioned corresponding to the two corners 4X of the upper frame 4, where no open portions 4b are formed, have the same thickness in the longitudinal direction as that of the respective supports 1b to 1d. Therefore, in the assembled liquid crystal display device 200, the two corners 1X of the intermediate frame 1 are placed in the upper frame 4, and also, the corresponding two corners 1Y of the intermediate frame 1 are arranged in the open portions 4b in the two corners of the upper frame 4. Moreover, in the assembled liquid crystal display device 200, the two corners 1Y of the intermediate frame 1 are exposed in the open portions 4b. Thereby, this prevents an external force or impact applied to the upper frame 4 from directly exerting an influence over the display surface of the liquid crystal display panel 3.

Figure 7:
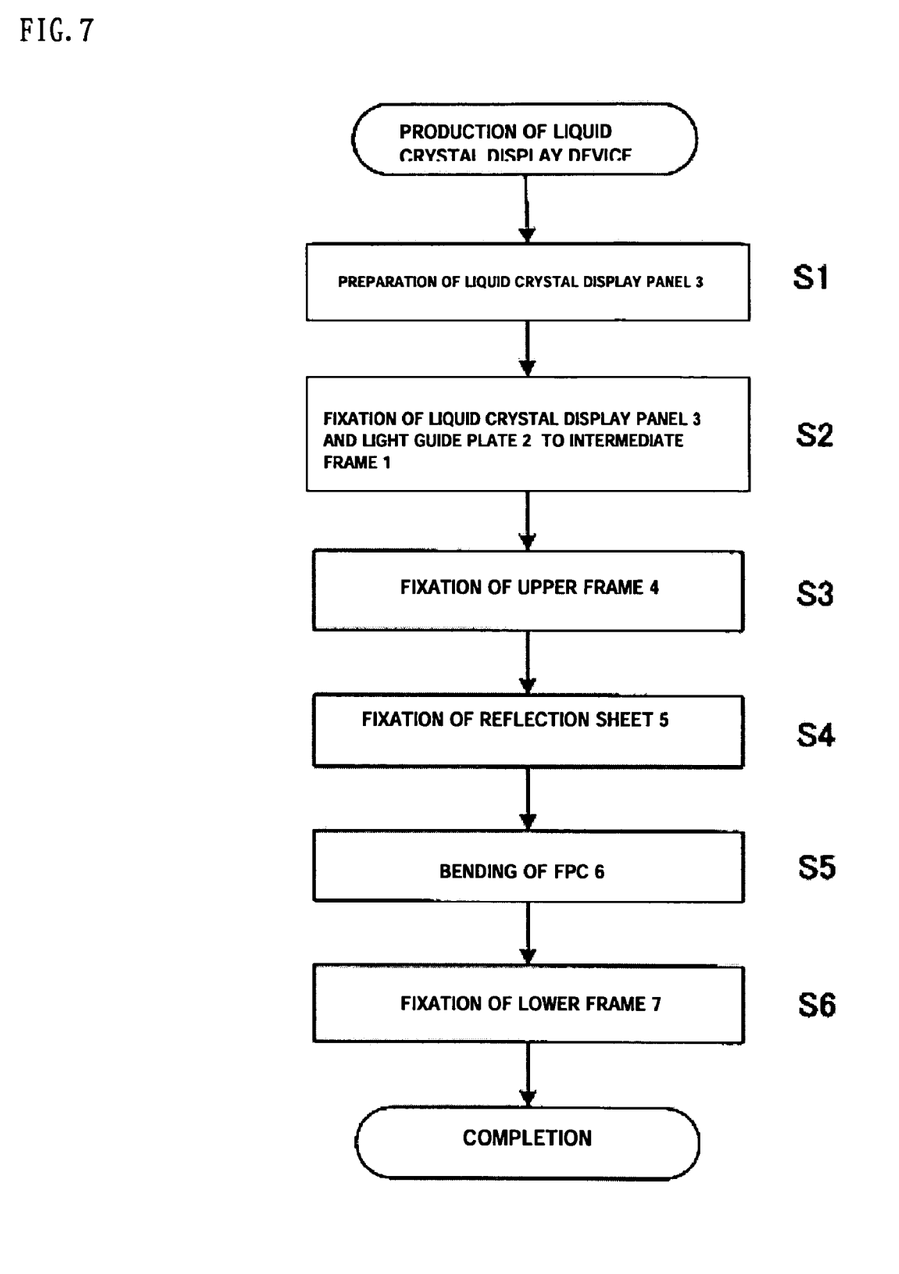
FIG. 7 is a flow chart of a method of producing the liquid crystal display devices according to the first and second embodiments.

Hereinafter, a method of producing the liquid crystal display device 100 or 200 will be described. FIG. 7 is a flow chart of the method of producing the liquid crystal display device.

First, the liquid crystal display panel 3 is produced (step S1). Specifically, liquid crystal is sealed between a pair of transparent plates 3a and 3b via a sealing member. Electronic parts such as a driver IC or the like are fixed on the projected portion 3c. The FPC 6 is fixed on the projected portion 3c using, e.g., ACF or the like.

Next, the liquid crystal display panel 3 and the light guide plate 2 are fixed to the intermediate frame 1 (step S2). The upper frame 4 is fixed thereon (step S3). Thus, a structure in which the liquid crystal display panel 3 and the light guide plate 2 are sandwiched between the intermediate frame 1 and the upper frame 4 is formed.

Then, the reflection sheet 5 is fixed to the lower surface of the intermediate frame 1 by a two-sided adhesive tape or the like (step S4). The FPC 6, of which one end is connected to the liquid crystal display panel 3 is bent and arranged below the reflection sheet 5 (step S5). The FPC 6 is fixed to the intermediate frame 1 by use of the lower frame 7 (step S6). Thus, the liquid crystal display device 100 or 200 as shown in FIG. 1 is produced.

Modification

In the liquid crystal display device 100 of the first embodiment, the open units 4b are formed in the four corners of the upper frame 4. In the assembled liquid crystal display device 200 of the second embodiment, the open portions 4b are formed in the two corners of the upper frame 4 in the positions corresponding to the side portions 7a of the lower frame 7. Moreover, according to the liquid crystal display device of the present invention, the open portions 4b may be formed in three corners of the upper frame 4. Thus, according to the liquid crystal display device of the present invention, the open portions 4b are formed in at least two corners of the upper frame 4. Thereby, an external force or impact applied to the upper frame 4 can be prevented from directly exerting an influence over the display surface of the liquid crystal display panel 3.

Electronic Apparatus

An embodiment in which the liquid crystal display device 100 or 200 according to the present invention is used as a display unit of an electronic apparatus will be described.

Figure 8:
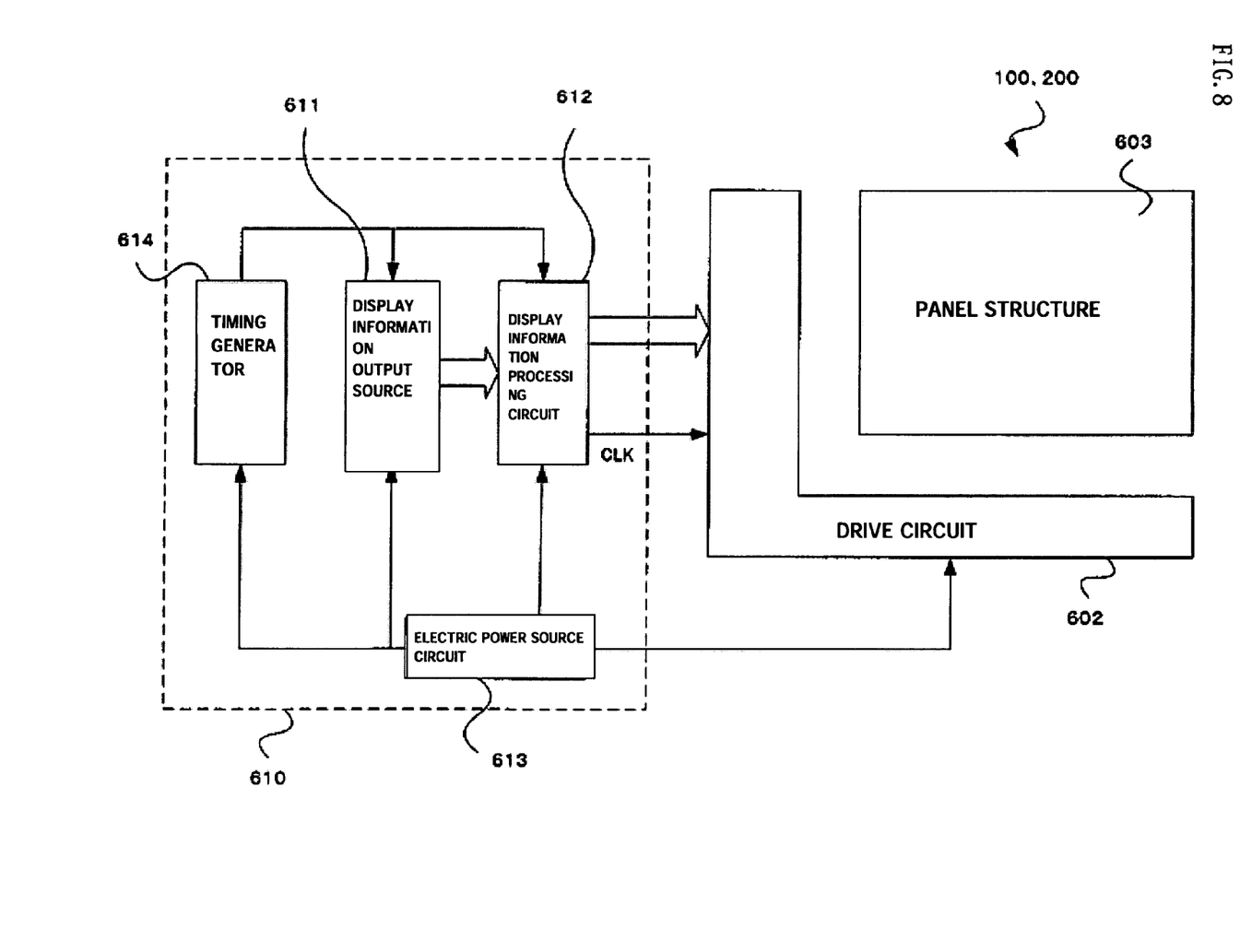
FIG. 8 shows the circuit configuration of an electronic apparatus to which the liquid crystal display device of the present invention is applied.

FIG. 8 schematically shows the whole of the configuration of this embodiment. The electronic apparatus shown here contains a liquid crystal display panel constituting the liquid crystal display device 100 or 200 and controller 610 for controlling the panel. The liquid crystal display panel is conceptually divided into a panel structure 603 and a drive circuit 602 containing a semiconductor IC or the like to be depicted in the drawing. The controller 610 contains a display information output source 611, a display information processing circuit 612, an electric power source 613, and a timing-generator 614.

The display information output source 611 contains a memory comprising ROM (Read Only Memory), RAM (Random Access Memory) or the like, a storage unit comprising a magnetic recording disk, an optical recording disk or the like, and a tuning circuit for tuning-outputting a digital image signal. Based on various clock signals formed by the timing-generator 614, display information in the form of an image signal having a predetermined format is supplied to the image information processing circuit 612.

The display information processing circuit 612 is provided with various circuits such as a serial-parallel conversion circuit, an amplification-inversion circuit, a rotation circuit, a gamma-correction circuit, a clamp circuit, and so forth. The circuit 612 processes the input display information, and supplies the image information, together with a clock signal CLK, to the drive circuit 602. The drive circuit 602 contains a scanning-line drive circuit, a data-line drive circuit, and an inspection circuit. The electric power circuit 613 supplies predetermined voltages to the above-described elements.

Figure 9:
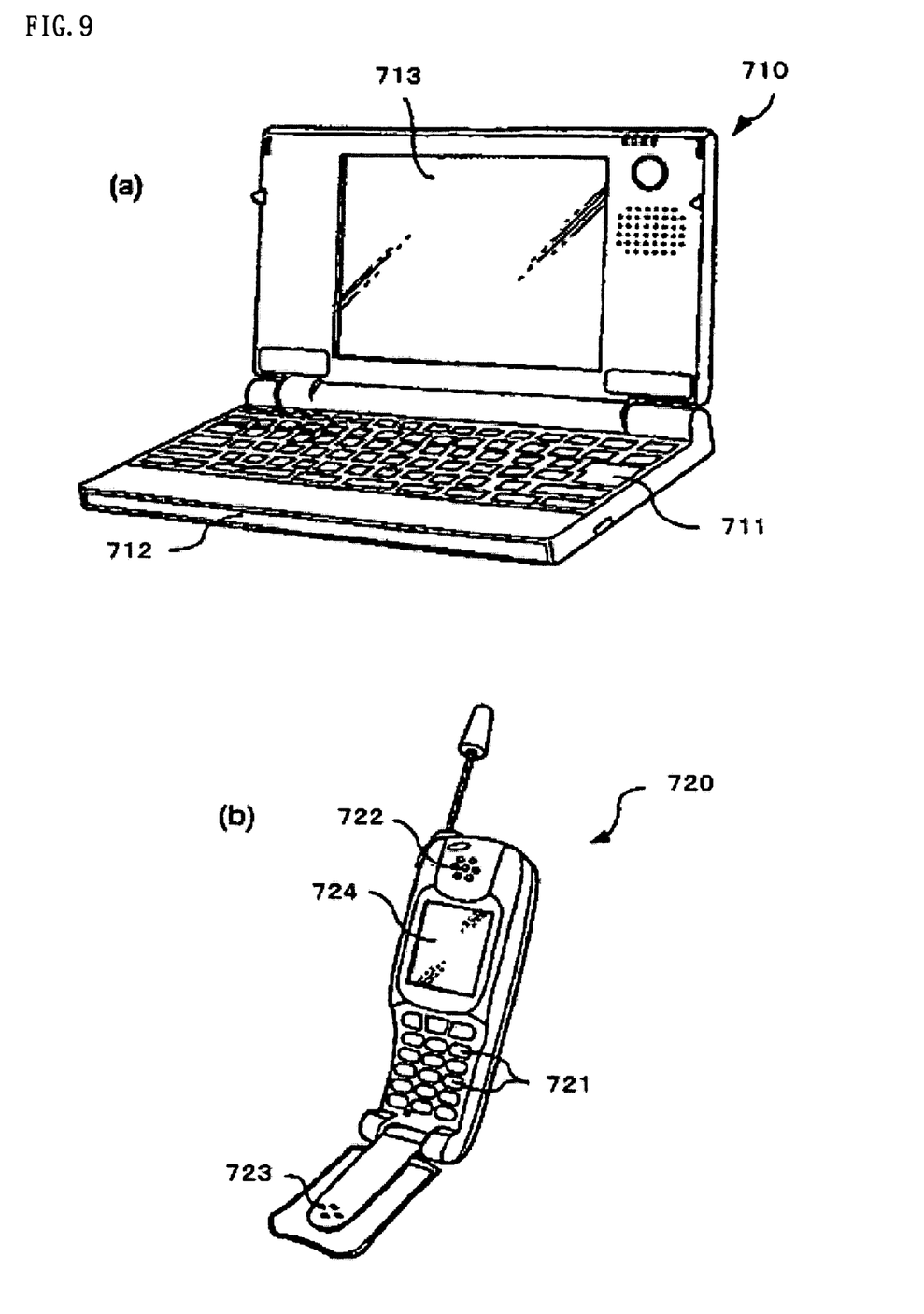
FIG. 9 shows an example of an electronic apparatus to which the present invention is applied.

Hereinafter, an embodiment of an electronic apparatus to which the liquid crystal display panel according to the present invention can be applied will be described with reference to FIG. 9.

First, an embodiment in which a liquid crystal display panel according to the present invention is applied as the display unit of a portable personal computer (a so-called notebook-sized personal computer) will be described. FIG. 9(a) is a perspective view showing the configuration of the personal computer. As shown in the drawing, the personal computer 710 contains a main unit 712 provided with a key board 711, and a display unit 713 to which the liquid crystal display panel according to the present invention is applied.

Then, an example in which a liquid crystal panel according to the present invention is applied to the display unit of a portable telephone will be described. FIG. 9(b) is a perspective view showing the configuration of the portable telephone. As shown in this drawing, the portable telephone 720 contains plural operation buttons 721, an ear-piece 722, a transmission piece 723, and a display unit 724 to which a liquid crystal panel according to the present invention is applied.

Electronic apparatuses to which a liquid crystal display panel according to the present invention can be applied include liquid crystal televisions, view finder type and monitor direct viewing type video tape recorders, car navigation equipment, pagers, electronic notebooks, desktop calculators, word processors, work stations, television telephones, POS terminals, digital still cameras, and so forth, in addition to the personal computer shown in FIG. 9(a) and the portable telephone shown in FIG. 9(b).

Similarly, the present invention can be applied to a variety of electro-optical devices such as electro-luminescence devices, organic electro-luminescence devices, plasma-display devices, electrophoretic display devices, field emission displays, and so forth, in addition to the liquid crystal display device.

What is claimed is:

1. An electro-optical device comprising:
   a metal upper frame having an opening therein and having open portions in at least two corners thereof;
   an electro-optical panel arranged below the upper frame, the electro-optical panel having an electro-optical substance between a pair of plates;
   a light guide plate arranged below the electro-optical panel;
   an intermediate frame arranged below the light guide plate and supporting the electro-optical panel and the light guide plate;
   a flexible board arranged below the intermediate frame, the flexible board being electrically connected to the electro-optical panel and having a light source mounted thereon; and
   a belt-shaped metal lower frame arranged below the flexible board and fixed to the intermediate frame;
   wherein the electro-optical panel and the light guide plate are sandwiched between the upper frame and the intermediate frame; and
   the upper frame and the lower frame do not contact each other.

2. An electro-optical device according to claim 1, wherein both longitudinal ends of the lower frame are bent and set in the open portions of the upper frame, the intermediate frame being disposed between the longitudinal ends of the lower frame and the open portions of the upper frame.

3. An electro-optical device according to claim 1, wherein the lower frame is fixed to the intermediate frame and covers the light source on the board.

4. An electro-optical device according to claim 1, wherein the light guide plate, the board, and the lower frame are arranged so that a center axis in a height direction of the light source coincides with a center axis in a thickness direction of the light guide plate.

5. An electro-optical device according to claim 1, wherein the lower frame includes bent peripheral edges along both short sides and a bent peripheral edge along at least one long side.

6. An electro-optical device according to claim 1, wherein a peripheral edge of the upper frame is bent.

7. An electronic apparatus including a display unit comprising the electro-optical device according to claim 1.

8. An electro-optical device comprising:
   a metal upper frame having an opening therein and having open portions in at least two corners thereof;
   an electro-optical panel arranged below the upper frame, the electro-optical panel having an electro-optical substance between a pair of plates;
   a light guide plate arranged below the electro-optical panel;
   an intermediate frame arranged below the light guide plate and supporting the electro-optical panel and the light guide plate;
   a flexible board arranged below the intermediate frame, the flexible board being electrically connected to the electro-optical panel and having a light source mounted thereon; and
   a belt-shaped metal lower frame arranged below the flexible board and fixed to the intermediate frame;
   wherein the electro-optical panel and the light guide plate are sandwiched between the upper frame and the intermediate frame;
   the upper frame and the lower frame are separated from each other;
   an end of the flexible board is bent and sandwiched between the intermediate frame and the lower frame; and
   a reflection sheet is provided between the intermediate frame and the flexible board.

* * * * *